United States Patent
Wu

(10) Patent No.: US 9,352,534 B2
(45) Date of Patent: May 31, 2016

(54) CERAMIC PLATE STRUCTURE

(71) Applicant: JEN LONG VACUUM INDUSTRIAL CO., LTD., Hsinchu County (TW)

(72) Inventor: Rong-Fu Wu, Hsinchu (TW)

(73) Assignee: JEN LONG VACUUM INDUSTRIAL CO., LTD., Hsinchu County (TW)

( * ) Notice: Subject to any disclaimer, the term of this patent is extended or adjusted under 35 U.S.C. 154(b) by 71 days.

(21) Appl. No.: 14/492,455

(22) Filed: Sep. 22, 2014

(65) Prior Publication Data

US 2016/0082704 A1    Mar. 24, 2016

(51) Int. Cl.
| | | |
|---|---|---|
| *C03C 17/34* | (2006.01) | |
| *B32B 17/06* | (2006.01) | |
| *B32B 7/12* | (2006.01) | |
| *B32B 18/00* | (2006.01) | |

(52) U.S. Cl.
CPC . *B32B 17/06* (2013.01); *B32B 7/12* (2013.01); *B32B 18/00* (2013.01); *C03C 17/3417* (2013.01); *C03C 17/3435* (2013.01); *B32B 2307/40* (2013.01); *B32B 2457/208* (2013.01); *C03C 2217/212* (2013.01); *C03C 2217/213* (2013.01); *C03C 2217/214* (2013.01); *C03C 2217/281* (2013.01); *C03C 2217/29* (2013.01)

(58) Field of Classification Search
None
See application file for complete search history.

(56) References Cited

U.S. PATENT DOCUMENTS

| | | | | |
|---|---|---|---|---|
| 5,726,247 | A * | 3/1998 | Michalczyk | C03C 17/009 428/421 |
| 2009/0324967 | A1* | 12/2009 | Disteldorf | C03C 17/36 428/428 |
| 2011/0212312 | A1* | 9/2011 | Thomsen | C03C 17/36 428/212 |
| 2011/0262726 | A1* | 10/2011 | Knoll | C03C 17/36 428/213 |
| 2012/0164420 | A1* | 6/2012 | Lemmer | C03C 17/3681 428/216 |
| 2013/0015677 | A1* | 1/2013 | Benito Gutierrez | C03C 17/36 296/84.1 |
| 2013/0216860 | A1* | 8/2013 | Imran | C03C 17/3618 428/623 |

FOREIGN PATENT DOCUMENTS

CN    103965673 A  *  8/2014

* cited by examiner

*Primary Examiner* — David Sample
(74) *Attorney, Agent, or Firm* — Muncy, Geissler, Olds & Lowe PC

(57) ABSTRACT

A ceramic plate structure includes a first transmittance-enhancing film layer disposed between a substrate and a first binding film layer, a conductive film layer disposed between the first binding film layer and a second binding film layer, and a second transmittance-enhancing film layer disposed between the second binding film layer and a ceramic layer. The ceramic layer renders the ceramic plate structure satisfactory in terms of transmittance gain, thermal conductivity coefficient, electrical insulation, rigidity, resistance to wear and tear, and resistance to wind erosion of the ceramic plate structure. The ceramic plate structure is suitable for use with touch panels to therefore enhance the cost-effectiveness of the manufacturing process of touch panels by cutting its material costs, reducing its power consumption, and shortening its production cycle. Accordingly, the anticipated benefits and objectives of the ceramic plate structure are attained.

12 Claims, 1 Drawing Sheet

CERAMIC PLATE STRUCTURE

BACKGROUND OF THE INVENTION

1. Technical Field

The present invention relates to ceramic plate structures, and more particularly, to a ceramic plate structure applicable to touch panels.

2. Description of Related Art

Due to the widespread use of smartphones, tablets, and the like, there is increasingly robust performance of touch panels and increasingly high demand for touch panels. In general, due to their cost efficiency, transparent glass plates and transparent plastic plates, among others, are important constituent elements of conventional touch panels. However, glass plates are not only brittle but also susceptible to scratches to the detriment of transparency and appearance. To render conventional touch panels resistant to scratches, the prior art discloses a scratchproof film disposed on a glass plate or a plastic plate by coating or plating. Nonetheless, the scratchproof film is not rigid enough to be effective.

To protect a touch panel, users affix conventional adhesive tape thereto, by disposing a plastic film on the transparent glass plate or transparent plastic plate of the touch panel. The conventional plastic film is generally of two types, namely high-transmittance film and frosted film. Although the high-transmittance film ensures that the touch panel is capable of clear display, the high-transmittance film is soft and thus susceptible to fingerprints and smears to the detriment of its appearance. As a result, the high-transmittance film has to be changed very often. The frosted film has a specific pattern on the surface and thus is insusceptible to fingerprints and smears. However, the frosted film manifests low transmittance, thereby indirectly deteriorating the display functionality of the touch panel.

To render the conventional touch panels more resistant to scratches, more scratchproof, high in transmittance, and less susceptible to fingerprints and smears, the prior art further proposes monocrystalline sapphire (wherein the monocrystalline sapphire described hereunder comprises aluminum oxide) be used as a major constituent element of the conventional touch panel and further discloses a sticker made from sapphire, wherein the sapphire sticker is disposed on the touch panel in the same manner as the conventional glass sticker or plastic adhesive tape is. Although the sapphire sticker surpasses the conventional transparent glass plate and transparent plastic plate in transmittance, thermal conductivity coefficient, electrical insulation, mechanical properties, rigidity, resistance to wear and tear, and resistance to wind erosion, the sapphire sticker is not suitable for mass production because of high investment costs of its processing process equipment, high power consumption incurred in its processing process, its long production cycle, and shortage of high-purity raw materials. Furthermore, unlike the conventional plastic adhesive tape which is soft and flexible, sapphire is rigid and thus adds to touch panel processing costs. In conclusion, in view of the aforesaid drawbacks of the prior art, there is still room for improvement of the prior art.

SUMMARY OF THE INVENTION

In view of the aforesaid drawbacks of the prior art, it is an objective of the present invention to provide a polycrystalline transparent ceramic plate structure applicable to touch panels and conducive to the enhancement of sensing performance and advantages of the touch panels.

In order to achieve the above and other objectives, the present invention provides a ceramic plate structure which comprises a substrate, a first transmittance-enhancing film layer, a first binding film layer, a conductive film layer, a second binding film layer, a second transmittance-enhancing film layer, and a ceramic layer. The substrate is a glass plate. The first transmittance-enhancing film layer is disposed between the substrate and the first binding film layer and adapted to provide transmittance gain to the ceramic plate structure. The conductive film layer, which is disposed on and attached to the first binding film layer and corresponds in position to the first transmittance-enhancing film layer, is for use in electrical conduction of the ceramic plate structure. The second binding film layer is disposed on and attached to the conductive film layer and corresponds in position to the first binding film layer. The second transmittance-enhancing film layer is disposed on and attached to the second binding film layer and corresponds in position to the conductive film layer, so as to provide transmittance gain to the ceramic plate structure. The ceramic layer is disposed on and attached to the second transmittance-enhancing film layer and corresponds in position to the second binding film layer, so as to augment the transmittance gain, thermal conductivity coefficient, electrical insulation, rigidity, resistance to wear and tear, and resistance to wind erosion of the ceramic plate structure.

In conclusion, the advantages and features of the present invention are as follows: a ceramic plate structure of the present invention is not only polycrystalline and transparent but also satisfactory in terms of transmittance gain, thermal conductivity coefficient, electrical insulation, rigidity, resistance to wear and tear, and resistance to wind erosion; the ceramic plate structure of the present invention is suitable for use with touch panels to therefore enhance the cost-effectiveness of the manufacturing process of touch panels by cutting its material costs, reducing its power consumption, and shortening its production cycle. Accordingly, the anticipated benefits and objectives of the present invention are attained.

Preferably, the ceramic plate structure of the present invention further comprises an antifouling layer disposed on and attached to the ceramic layer and corresponding in position to the second transmittance-enhancing film layer, wherein the antifouling layer comprises organic fluoride or inorganic coating to render the ceramic plate structure less susceptible to fingerprints and smears.

Preferably, the two transmittance-enhancing film layers of the ceramic plate structure of the present invention each comprise a composite of silicon oxide, silicon oxide, and silicon nitride or a composite of silicon oxide silicon nitride, and silicon oxide. Hence, the ceramic plate structure of the present invention performs optical sensing well.

Preferably, the two binding film layers of the ceramic plate structure of the present invention each comprise an optically clear adhesive or a liquid optically clear adhesive. Hence, the ceramic plate structure of the present invention demonstrates excellent optical performance.

Preferably, the ceramic layer of the ceramic plate structure of the present invention features a polycrystalline transparent structure and comprises aluminum oxide, thereby cutting the overall process cost.

Structural features, assembly technique, and advantages of a ceramic plate structure of the present invention are to be described below. Persons skilled in the art understand that the ensuing description and the embodiments of the present invention are illustrative of the structural features, assembly

DETAILED DESCRIPTION OF THE EMBODIMENT OF THE INVENTION

Figure 1:
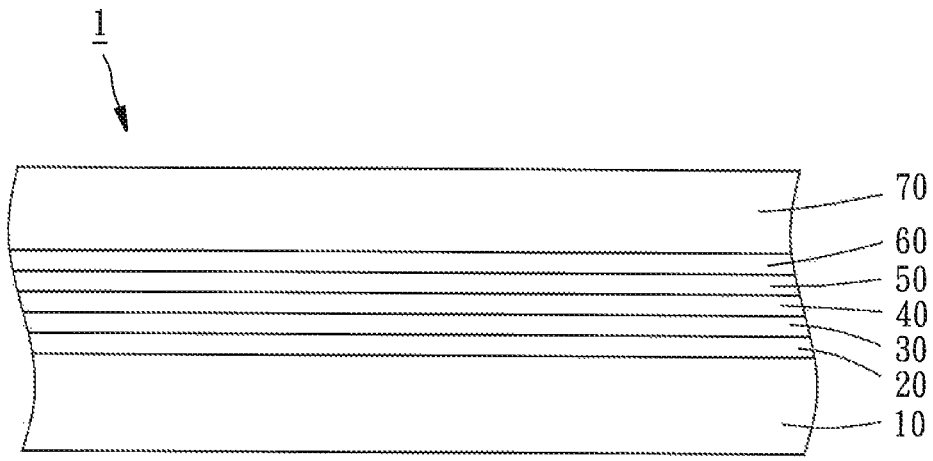
FIG. 1 is a schematic view of a ceramic plate structure according to a preferred embodiment of the present invention.

The structures, devices, and features thereof of the present invention are hereunder illustrated with embodiments and accompanying drawings. In the embodiments and accompanying drawings, identical reference numerals indicate identical or similar objectives or structural features thereof.

Referring to FIG. 1, a polycrystalline transparent ceramic plate structure 1 applicable to touch panels is provided in a preferred embodiment of the present invention.

The polycrystalline transparent ceramic plate structure 1 comprises a substrate 10, a first transmittance-enhancing film layer 20, a first binding film layer 30, a conductive film layer 40, a second binding film layer 50, a second transmittance-enhancing film layer 60, and a ceramic layer 70.

The first transmittance-enhancing film layer 20 is disposed between the substrate 10 and the first binding film layer 30. The conductive film layer 40 is disposed between the first binding film layer 30 and the second binding film layer 50. The second transmittance-enhancing film layer 60 is disposed between the second binding film layer 50 and the ceramic layer 70.

The substrate 10 is a glass plate.

The first transmittance-enhancing film layer 20 is disposed on and attached to the substrate 10 and adapted to provide transmittance gain to the ceramic plate structure 1. The first transmittance-enhancing film layer 20 comprises one or more layers of a composite of silicon oxide, silicon oxide, and silicon nitride or composite of silicon oxide silicon nitride, and silicon oxide. In a preferred embodiment of the present invention, melt adhesion of the substrate 10 and the ceramic layer 70 of the ceramic plate structure 1 is achieved by pulse laser thermal fusion.

The first binding film layer 30 is disposed on and attached to the first transmittance-enhancing film layer 20 and corresponds in position to the substrate 10. The first binding film layer 30 comprises an optically clear adhesive or a liquid optically clear adhesive. The optically clear adhesive of the first binding film layer 30 in a preferred embodiment of the present invention includes, but is not limited to, optically clear adhesives produced by 3M OCA 8172, 3M OCA 8272, Nitto Denko OCA, Ushine Photonics, BenQ Materials, Chimei Materials, Innotack OCA CA021, Innoplus OCA 5503, Innoplus OCA 5505, and InTech Materials OCA KTA075. The liquid optically clear adhesive of the first binding film layer 30 in a preferred embodiment of the present invention includes, but is not limited to, liquid optically clear adhesives produced by 3M LOCA 2175.

The conductive film layer 40, which is disposed on and attached to the first binding film layer 30 and corresponds in position to the first transmittance-enhancing film layer 20, is for use in electrical conduction of the ceramic plate structure 1.

The second binding film layer 50 is disposed on and attached to the conductive film layer 40 and corresponds in position to the first binding film layer 30. Likewise, the second binding film layer 50 comprises an optically clear adhesive or a liquid optically clear adhesive. The optically clear adhesive of the second binding film layer 50 in a preferred embodiment of the present invention includes, but is not limited to, optically clear adhesives produced by 3M OCA 8172, 3M OCA 8272, Nitto Denko OCA, Ushine Photonics, BenQ Materials, Chimei Materials, Innotack OCA CA021, Innoplus OCA 5503, Innoplus OCA 5505, and InTech Materials OCA KTA075. Likewise, the liquid optically clear adhesive of the second binding film layer 50 in a preferred embodiment of the present invention includes, but is not limited to, liquid optically clear adhesives produced by 3M LOCA 2175.

The second transmittance-enhancing film layer 60, which is disposed on and attached to the second binding film layer 50 and corresponds in position to the conductive film layer 40, provides transmittance gain to the ceramic plate structure 1. Likewise, the second transmittance-enhancing film layer 60 comprises one or more layers of a composite of silicon oxide, silicon oxide and silicon nitride or composite of silicon oxide, silicon nitride, and silicon oxide.

The ceramic layer 70, which is disposed on and attached to the second transmittance-enhancing film layer 60 and corresponds in position to the second binding film layer 50, augments the transmittance gain, thermal conductivity coefficient, electrical insulation, rigidity, resistance to wear and tear, and resistance to wind erosion of the ceramic plate structure 1. In a preferred embodiment of the present invention, the ceramic layer 70 comprises aluminum oxide and features a polycrystalline transparent structure. Melt adhesion of the ceramic layer 70 and the substrate 10 of the ceramic plate structure 1 is achieved by pulse laser thermal fusion.

Related components and connection-related relationships thereof in the preferred embodiments of the present invention are described above. The advantages of the preferred embodiments of the present invention are described below.

The advantages and features of the present invention lie in the polycrystalline transparent ceramic layer 70 of the ceramic plate structure 1 and its excellent features, namely satisfactory transmittance gain, satisfactory thermal conductivity coefficient, satisfactory electrical insulation, satisfactory rigidity, satisfactory resistance to wear and tear, and satisfactory resistance to wind erosion. The ceramic plate structure 1 is suitable for use with touch panels to therefore enhance the cost-effectiveness of the manufacturing process of touch panels by cutting its material costs, reducing its power consumption, and shortening its production cycle. Accordingly, the anticipated benefits and objectives of the ceramic plate structure are attained.

The polycrystalline transparent ceramic plate structure 1 in a preferred embodiment of the present invention exhibits rigidity as much as monocrystalline sapphire (wherein the monocrystalline sapphire in a preferred embodiment of the present invention comprises aluminum oxide) to therefore not only indirectly meet the quality requirements of high resistance to wear and tear with respect to touch panels with the ceramic plate structure 1 and related products under limited cost control but also attain high transmittance characteristics of touch panels with the ceramic plate structure 1 and related products, enhance their adaptation to ambient temperature, and enhance their corrosion resistance and stability. Accordingly, the anticipated benefits and objectives of the ceramic plate structure 1 are attained.

Preferably, when the ceramic plate structure 1 has a total thickness of 0.2 mm~0.7 mm, touch panels with the ceramic plate structure 1 and related products exhibit satisfactory touch sensitivity and transmittance.

Preferably, the two transmittance-enhancing film layers 20, 60 of the ceramic plate structure 1 each comprise a composite of silicon oxides. The two transmittance-enhancing film layers 20, 60 are 620 nm~680 nm thick each, such that a touch panel with the ceramic plate structure 1 and related products have an average transmittance of 97% and manifest a 11.5% increase in transmittance.

Preferably, the two transmittance-enhancing film layers 20, 60 of the ceramic plate structure 1 each comprise a composite of silicon oxides. The two transmittance-enhancing film layers 20, 60 are 1820 nm~2020 nm thick each, such that a touch panel with the ceramic plate structure 1 and related products have an average transmittance of 94% and manifest a 8.0% increase in transmittance.

Preferably, the two transmittance-enhancing film layers 20, 60 of the ceramic plate structure 1 each comprise a composite of silicon oxide and silicon nitride. The silicon oxide sub-layer and silicon nitride sub-layer of each of the two transmittance-enhancing film layers 20, 60 are 620 nm~680 nm thick and 900 nm~980 nm thick, respectively, such that a touch panel with the ceramic plate structure 1 and related products have an average transmittance of 99% and manifest a 13.8% increase in transmittance.

Preferably, the two transmittance-enhancing film layers 20, 60 of the ceramic plate structure 1 each comprise a composite of silicon oxide, silicon nitride, and silicon oxide. The silicon oxide sub-layer, silicon nitride sub-layer, and silicon oxide sub-layer of each of the two transmittance-enhancing film layers 20, 60 are 810 nm~890 nm thick, 150 nm~170 nm thick, and 1410 nm~1560 nm thick, respectively, such that a touch panel with the ceramic plate structure 1 and related products have an average transmittance of 92% and manifest a 5.7% increase in transmittance.

Preferably, the two transmittance-enhancing film layers 20, 60 of the ceramic plate structure 1 each comprise a composite of silicon oxide, silicon nitride, and silicon oxide. The silicon oxide sub-layer, silicon nitride sub-layer, and silicon oxide sub-layer of the two transmittance-enhancing film layers 20, 60 are 810 nm~890 nm thick, 150 nm~170 am thick, and 1410 nm~1560 nm thick, such that a touch panel with the ceramic plate structure 1 and related products have an average transmittance of 98% and manifest a 12.6% increase in transmittance.

Related components, connection-related relationships thereof, and advantages thereof in a preferred embodiment of the present invention are described above. Structures and advantages thereof in another preferred embodiment of the present invention are described below.

Figure 2:
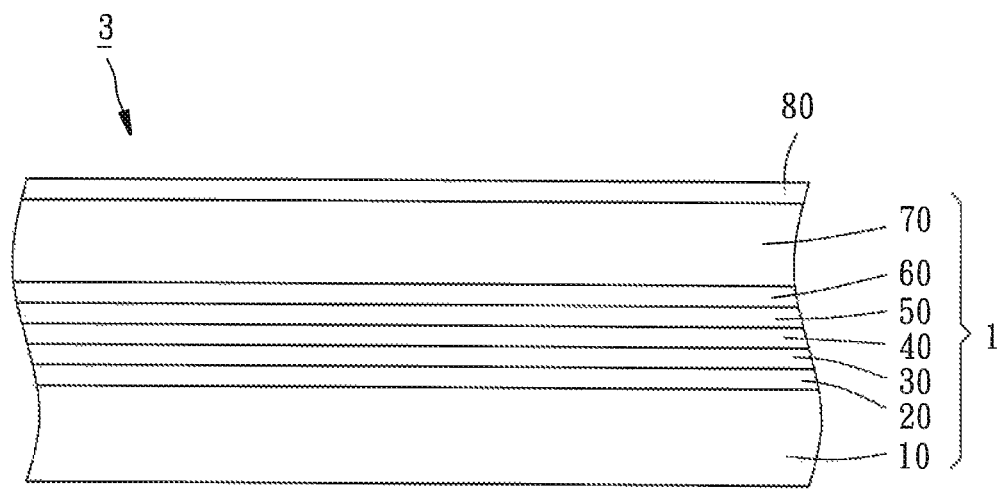
FIG. 2 is a schematic view of another ceramic plate structure according to another preferred embodiment of the present invention.

Referring to FIG. 2, a ceramic plate structure 3 in another preferred embodiment of the present invention is generally identical to the ceramic plate structure 1 in the preceding embodiment of the present invention in terms of structures and advantages, but exceptions are described below.

The ceramic plate structure 3 further has an antifouling layer 80 disposed on and attached to the ceramic layer 70 and corresponding in position to the second transmittance-enhancing film layer 60 to render the ceramic plate structure 3 less susceptible to fingerprints and smears. In another preferred embodiment of the present invention, the antifouling layer 80 comprises organic fluoride or inorganic coating, including but not limited to nano silicon dioxide, nano titanium dioxide, or nano aluminum oxide.

Constituent devices and objects disclosed in the aforesaid embodiments of the present invention are illustrative rather than restrictive of the scope of the present invention, and thus replacements or variations of all the other equivalent devices and objects must fall within the claims of the present invention.

What is claimed is:

1. A ceramic plate structure, comprising:
    a substrate, a first transmittance-enhancing film layer, a first binding film layer, a conductive film layer, a second binding film layer, a second transmittance-enhancing film layer, and a ceramic layer;
    wherein the substrate is a glass plate;
    wherein the first transmittance-enhancing film layer is disposed between the substrate and the first binding film layer and adapted to provide transmittance gain to the ceramic plate structure;
    wherein the conductive film layer is disposed on and attached to the first binding film layer and corresponds in position to the first transmittance-enhancing film layer to effectuate electrical conduction of the ceramic plate structure;
    wherein the second binding film layer is disposed on and attached to the conductive film layer and corresponds in position to the first binding film layer;
    wherein the second transmittance-enhancing film layer is disposed on and attached to the second binding film layer and corresponds in position to the conductive film layer to provide transmittance gain to the ceramic plate structure;
    wherein the ceramic layer is disposed on and attached to the second transmittance-enhancing film layer and corresponds in position to the second binding film layer to augment transmittance gain, thermal conductivity coefficient, electrical insulation, rigidity, resistance to wear and tear, and resistance to wind erosion of the ceramic plate structure; and
    wherein the ceramic layer features a polycrystalline transparent structure and comprises aluminum oxide.

2. The ceramic plate structure of claim 1, wherein the first transmittance-enhancing film layer and the second transmittance-enhancing film layer each comprise one of a composite of silicon oxide, silicon oxide and silicon nitride and a composite of silicon oxide, silicon nitride, and silicon oxide.

3. The ceramic plate structure of claim 2, wherein the first binding film layer and the second binding film layer each comprise one of an optically clear adhesive and a liquid optically clear adhesive.

4. The ceramic plate structure of claim 3, further comprising an antifouling layer disposed on and attached to the ceramic layer and corresponding in position to the second transmittance-enhancing film layer, wherein the antifouling layer comprises one of organic fluoride and inorganic coating to render the ceramic plate structure less susceptible to fingerprints and smears.

5. The ceramic plate structure of claim 4, wherein the antifouling layer comprises one of nano silicon dioxide, nano titanium dioxide, and nano aluminum oxide.

6. The ceramic plate structure of claim 2, further comprising an antifouling layer disposed on and attached to the ceramic layer and corresponding in position to the second transmittance-enhancing film layer, wherein the antifouling layer comprises one of organic fluoride and inorganic coating to render the ceramic plate structure less susceptible to fingerprints and smears.

7. The ceramic plate structure of claim 6, wherein the antifouling layer comprises one of nano silicon dioxide, nano titanium dioxide, and nano aluminum oxide.

8. The ceramic plate structure of claim 1, wherein the first binding film layer and the second binding film layer each comprise one of an optically clear adhesive and a liquid optically clear adhesive.

9. The ceramic plate structure of claim 8, further comprising an antifouling layer disposed on and attached to the ceramic layer and corresponding in position to the second transmittance-enhancing film layer, wherein the antifouling layer comprises one of organic fluoride and inorganic coating to render the ceramic plate structure less susceptible to fingerprints and smears.

10. The ceramic plate structure of claim 9, wherein the antifouling layer comprises one of nano silicon dioxide, nano titanium dioxide, and nano aluminum oxide.

11. The ceramic plate structure of claim 1, further comprising an antifouling layer disposed on and attached to the ceramic layer and corresponding in position to the second transmittance-enhancing film layer, wherein the antifouling layer comprises one of organic fluoride and inorganic coating to render the ceramic plate structure less susceptible to fingerprints and smears.

12. The ceramic plate structure of claim 11, wherein the antifouling layer comprises one of nano silicon dioxide, nano titanium dioxide, and nano aluminum oxide.

\* \* \* \* \*